Jan. 8, 1924.
J. T. PEDERSEN
COFFEE URN
Filed Oct. 5, 1922
1,480,413
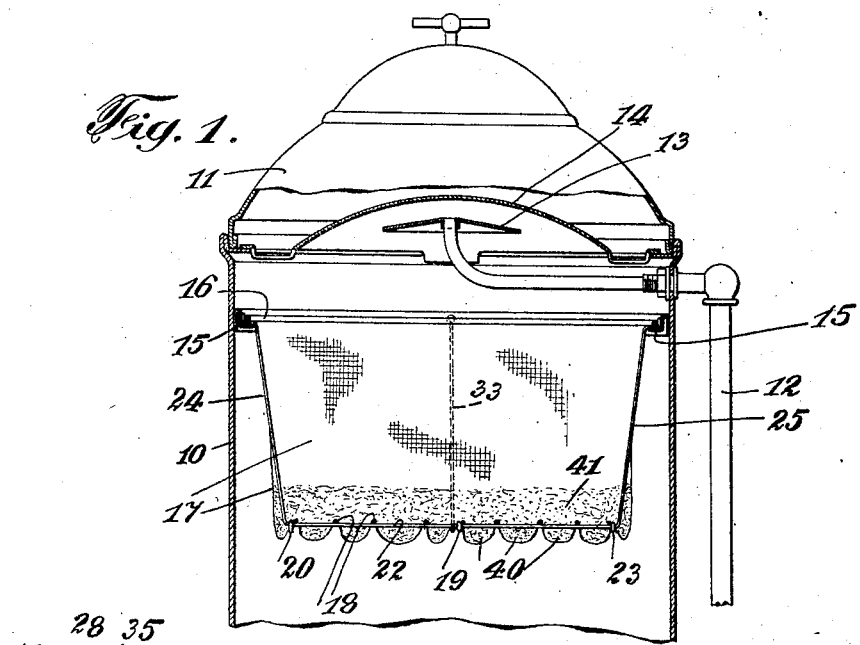
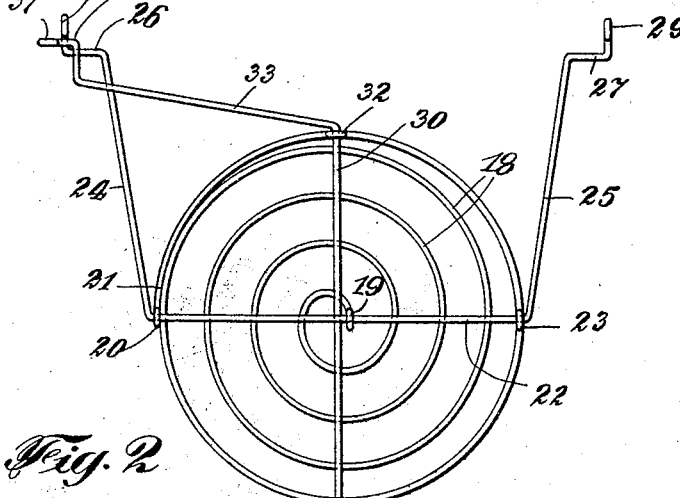
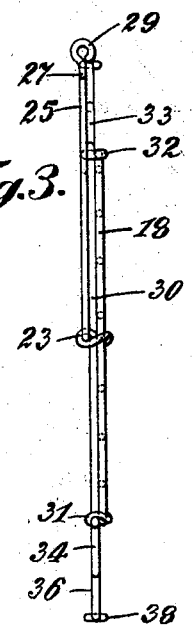
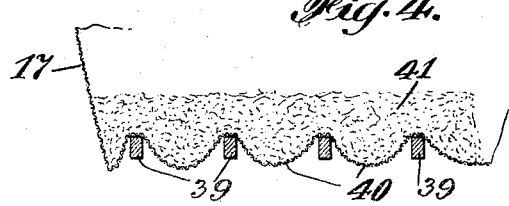
Inventor
Johannes Th. Pedersën
His Attorneys Patented Jan. 8, 1924.

1,480,413

UNITED STATES PATENT OFFICE.

JOHANNES TH. PEDERSËN, OF FLUSHING, NEW YORK.

COFFEE URN.

Application filed October 5, 1922. Serial No. 592,494.

*To all whom it may concern:*

Be it known that I, JOHANNES TH. PEDERSËN, a citizen of the United States, residing at Flushing, borough of Queens, city and State of New York, have invented an Improvement in Coffee Urns, of which the following is a specification.

My present invention relates to a coffee urn and more particularly to an attachment therefor to serve as a support for the coffee bag usually employed as a part of that type of coffee urns which are commonly employed in restaurants, hotels and similar places where coffee urns of the larger type are used. Heretofore in the use of this type of coffee urn the coffee when ground has been placed in the bag and the bag put in position in the body of the urn whereby the weight of the coffee, depending upon the amount thereof, causes the bag to assume various tapering shapes and the coffee when wet forms a mass which tends to consolidate and thereby to prevent the proper circulation of the liquid through the coffee to obtain the best results in making the beverage. The object of my invention is to overcome this difficulty and in doing so I employ a support for the bottom of the bag so that the coffee when placed in the bag is evenly distributed therein in order to permit of a proper distribution and percolation of the liquid as well also as to provide a means for the circulation of the liquid at the bottom of the bag.

In carrying out the invention, the bag support comprising the same preferably includes a spirally formed frame upon which the coffee bag rests and a plurality of supporting arms or devices which permit of the suspension of the frame in such a manner as to receive and support the bottom of the bag, as will be hereinafter more particularly described.

In the drawing:

Fig. 1 is a central cross section and partial elevation of the upper part of a coffee urn illustrating the use of my present invention.

Fig. 2 is a plan of the support for the coffee bag.

Fig. 3 is an edge view of the same, and

Fig. 4 is a partial cross section diagrammatically illustrating another shape in cross section of the material of which the spirally disposed support may be made.

Referring to the drawing, and particularly to Fig. 1, the device comprising my present invention is adapted to be used with a coffee urn in which the cylindrical body is indicated at 10. As is customary the body of the urn is fitted with a cover 11 and may be provided with a circulating pipe 12 which terminates interiorly of the urn in a distributor 13 over which there is a spreader member 14. As illustrated in this figure, the body of the urn is provided interiorly with a rib or flange 15 adapted to receive and support the ring 16 to which the coffee bag 17 is attached in the usual manner. These members of the urn, however, form no part of my present invention.

The support device in which the invention resides comprises a spirally arranged member 18 as indicated in Figs. 2 and 3 of the drawing. This spiral support as indicated in these figures may be made of wire of any desired weight or other similar material. At the inner end the wire forming the spiral terminates in an eye 19 and at the outer end in a similar eye 20, the outer end of the spiral support being connected to the adjacent convolution of the spiral by being braced or soldered thereto as indicated at 21, or in any other suitable manner. Together with the spirally disposed support I employ a suitable means for suspending the same in order to permit the bottom of the coffee bag to rest upon the support. As indicated in the drawing the spiral support may be suspended by cross bars and arms, the extremities of which are adapted to coact with the ring of the coffee bag or otherwise, it being understood, however, that the illustration and the following description of these suspending means are merely illustrative as other equivalent devices may be employed for this purpose. One of the cross bars is indicated at 22. This passes through and is journaled in the eyes 19 and 20 as well as in a similar eye 23 secured to the outer convolution of the spiral in a position diametrically opposite the eye 20. The cross rod 22 exteriorly of the eyes 20 and 23 is bent to form arms 24 and 25 adjacent the extremities of which there are angular or offset shoulder portions 26 and 27, while the ends of these arms terminate in eyes or loops 28 and 29. The other cross rod is indicated at 30. This extends beneath the spiral support in a position at right angles to the cross rod 22 and passes through eyes 31 and 32 in which the rod is journaled and which are suitably attached to the outer convolutions of the spiral. In a similar manner those portions of the cross rod 30 extending beyond the bearing eyes 31 and 32 are bent at an angle thereto to form arms 33 and 34. Adjacent the ends of these arms there are angularly disposed shoulders 35 and 36 and the ends of the arms terminate in eyes or loops 37 and 38. It will now be apparent that these cross rods may be turned in the bearing eyes to cause the arms 24, 25, 33 and 34 to extend upwardly therefrom so that the shoulder portions of the arms rest upon the same rib 15 in the body of the urn that supports the ring of the coffee bag in order to permit the bottom of the bag to rest upon the spirally disposed support. As illustrated in Fig. 1, the ring of the coffee bag rests and is supported upon the upper portions of the angular members of the arms inasmuch as these arms as illustrated are turned outwardly. It will be understood, however, that the arms may be provided with inturned angular portions or other equivalent devices by which the spirally disposed support may be suspended above the ring of the coffee bag. Obviously also other equivalent devices may be provided for suspending the support. Furthermore the cross rods and the arms extending therefrom, as will be apparent, may be turned to the position shown in Figs. 2 and 3 in which the parts lie in substantially the same plane so as to be practically flat for packing and shipping purposes. As shown in Fig. 4 the material of which the spirally disposed support may be made may have a rectangular cross section as indicated at 39 instead of a circular cross section as shown in the other figures of the drawing. It will be obvious, however, that these or other forms of material of various cross sections may be employed.

As clearly illustrated in Figs. 1 and 4, when the support is in its proper position the bottom of the bag rests upon the convolutions of the spiral and assumes a loop configuration as indicated at 40, each loop extending between adjacent parts of the spiral support by the weight of the coffee 41 when placed in the bag. This results in an even distribution of the coffee and a corresponding even distribution of the liquid in passing through the coffee. It will furthermore be apparent that because of the spirally disposed frame the tendency of the liquid will be to follow the spiral convolutions of the frame from the outer portions to the inner portions thereof so that to a certain extent, at least, there is a retarded percolation of the liquid through the coffee thus supported. It is also to be understood that while I have hereinbefore described the coffee bag support member as being a spirally constructed frame, the invention is not limited to a spiral construction as obviously the cross bars or their equivalents might be connected to a plurality of concentric rings, for example, or other equivalent constructions might be employed to accomplish the same results.

I claim as my invention:

1. In a coffee urn, a spiral frame, rods connected to the spiral frame, and supporting means extending from the rods and turnable to lie in positions substantially parallel with the frame and to be extended to positions at substantial right angles thereto to support the frame in the coffee urn.

2. In a coffee urn, a spiral frame, rods extending across and pivotally connected to the said frame, and supporting means extending from the rods and turnable therewith for supporting the frame in the urn.

3. In a coffee urn, a coffee bag, a ring to which the coffee bag is attached, means for supporting the said ring to suspend the coffee bag in the urn, a spiral frame, cross rods pivotally mounted in the said spiral frame, and devices extending from the cross rods and turnable therewith for suspending the frame from the means which support the ring of the coffee bag in order to support the bottom of the coffee bag upon the spiral frame to obtain an even distribution of the coffee in the bag.

4. In a coffee urn, a coffee bag, a ring to which the coffee bag is attached, means for supporting the said ring to suspend the coffee bag in the urn, a spiral frame, cross rods pivotally mounted in the said spiral frame, and arms extending from the said cross rods and provided with shoulders for coacting with the ring of the coffee bag and the said means for supporting the same in order to suspend the spiral frame beneath the coffee bag to support the bottom thereof and obtain an even distribution of the coffee therein.

Signed by me this 7th day of September, 1922.

JOHANNES TH. PEDERSEN.